United States Patent
Chawanya et al.

[19]

[11] Patent Number: 5,973,888
[45] Date of Patent: Oct. 26, 1999

[54] CRASH STOP AND DISK DRIVE EMPLOYING THE CRASH STOP

[75] Inventors: Takeshi Chawanya, Fujisawa; Shingo Tsuda, Yokohama; Yasuhiko Kato, Fujisawa; Kiyoshi Satoh, Ayase, all of Japan

[73] Assignee: International Business Machines Corporation, Armonk, N.Y.

[21] Appl. No.: 09/030,642

[22] Filed: Feb. 25, 1998

[30] Foreign Application Priority Data

Feb. 28, 1997 [JP] Japan ..................................... 9-045694

[51] Int. Cl.⁶ ....................................................... G11B 5/54
[52] U.S. Cl. ............................................. 360/105; 360/106
[58] Field of Search ..................................... 360/105, 106

[56] References Cited

U.S. PATENT DOCUMENTS 5,369,538  11/1994  Moe et al. ............................... 360/106

Primary Examiner—Robert S. Tupper
Attorney, Agent, or Firm—Noreen A. Krall

[57] ABSTRACT

The present invention provides a crash stop which is capable of adjusting shock absorptivity by employing the same elastic material and where the mounting and demounting operations are easy. A metal pin has a recess in its intermediate portion. An elastic body has three blade portions. In a crash stop, the metal pin is press fitted into the pin inserting hole of the elastic body, and the portion between the support portion and the knob portion of the metal pin is covered with the elastic body. In the boundary between the intermediate portion of the metal pin and the elastic body, a cavity is formed. The support portion is fitted into the crash stop support hole of the base so that it can be freely pulled out and inserted. At this time, the upper end of the blade portion contacts the inner side surface of the crash stop inserting hole of the upper yoke and is contracted, and by the frictional force generated between the crash stop inserting hole and the upper end of the blade portion, the crash stop is locked. The abutting shock of the stopper arm of an actuator is absorbed with cooperation of the elastic body and the cavity.

12 Claims, 7 Drawing Sheets

CRASH STOP AND DISK DRIVE EMPLOYING THE CRASH STOP

BACKGROUND OF THE INVENTION

1. Field of the Invention

The present invention relates to a disk drive, particularly a magnetic-disk drive and a crash stop which regulates a range of rotation of the actuator of the magnetic-disk drive. More particularly, the invention relates to a crash stop which is capable of adjusting the setting of shock absorptivity with the same elastic material and where the mounting-demounting operation is easy.

2. Description of Related Art

Generally, a magnetic-disk drive includes a magnetic disk which is a data storage medium and an actuator which moves a magnetic head along the surface of the magnetic disk. The actuator is equipped with a carriage which is rotatably fitted on a rotational shaft and a voice coil motor (VCM) which drives this carriage. The carriage is provided with a head arm, on the front end of which the magnetic head is mounted. Also, the carriage is provided with a stopper arm on the carriage surface opposite to the head arm across the rotational shaft. This stopper arm has the voice coil of the VCM mounted thereon. The VCM has the aforementioned voice coil, lower and upper yokes disposed above and under the stopper arm, and a magnetic circuit formed by permanent magnets. The VCM drives the carriage, thereby rotating the head arm. This causes the magnetic head mounted on the front end of the head arm to move over a predetermined position on the disk surface to record data on the magnetic disk or read out recorded data from the magnetic disk.

A magnetic-disk drive such as that described above is provided with a crash stop for prescribing the range of rotation of the actuator. The crash stop is abutted by the stopper arm, thereby prescribing the aforementioned range of rotation. The crash stop is typically comprised of an inner crash stop that prescribes the innermost circumference to which the magnetic head can move on the magnetic disk surface and an outer crash stop that prescribes the outermost circumference to which the magnetic head can move. The inner and outer crash stops, therefore, are provided on both ends of the range of rotation of the stopper arm.

Examples of crash stops found in the art include those having an elastic body such as rubber, or alternatively those comprised of a metal pin such as a stainless steel pin. The crash stop comprising an elastic body has the disadvantages that it lacks the mounting stability and the range of rotation of the actuator will fluctuate due to a displacement in the portion that the stopper arm abuts. In the crash stop comprising a metal pin, the range of rotation of the actuator does not fluctuate but absorption of shock is insufficient, and thus when the actuator runs recklessly and crashes on the crash stop there is the possibility that it will damage a disk surface.

Additionally, there are found crash stops having both the shock absorptivity of an elastic body and the mounting stability of a metal pin, which are comprised of a structure where a metal pin is covered with an elastic body. The shock absorptivity of this crash stop, however, generally becomes smaller than that of a crash stop comprising an elastic body alone. This crash stop is attached to the bottom portion (referred to as the base) of an enclosure or an upper yoke or a lower yoke, for example, by screws.

It is not easy to adjust or vary the shock absorptivity of the conventional crash stop comprising a metal pin covered with an elastic body. Particularly, in the case where design change is performed from a crash stop comprising an elastic body alone to a crash stop comprising a metal pin and an elastic body, if the elastic material used in the crash stop comprising an elastic body alone is employed as it is, there will arise a need to enhance the shock absorptivity, because the shock absorptivity will be worse than that of the crash stop with an elastic body alone. As a countermeasure for this, it is conceivable to change the elastic body to an even softer, elastic body or to thicken the elastic body. However, the elastic materials that can be used are often limited to materials that have been used so far, to avoid the having to test whether new elastic materials are suitable to the interior of the disk drive. For this reason, in many cases, materials with desired shock absorptivity cannot be used. Also, if the thickness of an elastic body is varied, the mounting position of the crash stop must be changed according to that variation, or the diameter of the metal pin must be varied, and consequently, other components will be obliged to be redesigned.

During the disk drive assembly process, after magnetic disks are incorporated into the enclosure, then the carriage is fitted on the rotational arm, and after the magnetic head is moved over the surface of the magnetic disk by rotation of the carriage, or furthermore, after the upper yoke is incorporated, the crash stop is mounted. This is because the mounting and demounting of the carriage will not be able to be performed, if the crash stop is first mounted.

In addition, because the mounting of the crash stop is performed in the end of the assembling process of the magnetic-disk drive and the crash stop needs to be first demounted when the magnetic head or carriage is repaired, other disposed components will be hindrances and there will arise the problem that the mounting-demounting operation will be troublesome.

It therefore can be seen that there is a need in the prior art to provide a crash stop which is capable of adjusting shock absorptivity with the same elastic material and where the mounting-demounting operation is easy.

SUMMARY OF THE INVENTION

The present invention has been made in order to solve the aforementioned conventional problems. It is an object of the present invention to provide a crash stop which is capable of adjusting shock absorptivity with the same elastic material and where the mounting-demounting operation is easy. Another object of the invention is to provide a magnetic-disk drive which is excellent in protection performance of the actuator and where the assembling and maintenance operations are easy.

To achieve the aforementioned objects, the crash stop of the present invention is characterized in that shock absorptivity is enhanced, by providing a cavity in at least a portion of the boundary between a metal pin and an elastic body.

In a preferred embodiment of the crash stop of the present invention, the first end portion of a metal pin is used as a support portion which is freely removably fitted into a crash stop support hole provided in a bottom portion of an enclosure of the disk drive, and the second end portion is used as a knob portion for allowing said support portion to be detachable with respect to the crash stop support hole. The portion of the metal pin between the support portion and the knob portion is press-fitted into an elastic body having more than one blade portion. The support portion of the metal pin is fitted into the crash stop support hole, thereby achieving an enhancement in the mounting-demounting operability.

The magnetic-disk drive of the present invention includes enhancements in the protection performance of the actuator. Assembly and maintenance operability of the magnetic-disk drive are also achieved by employing the crash stop of the present invention.

DETAILED DESCRIPTION OF THE PREFERRED EMBODIMENT

Figure 1:
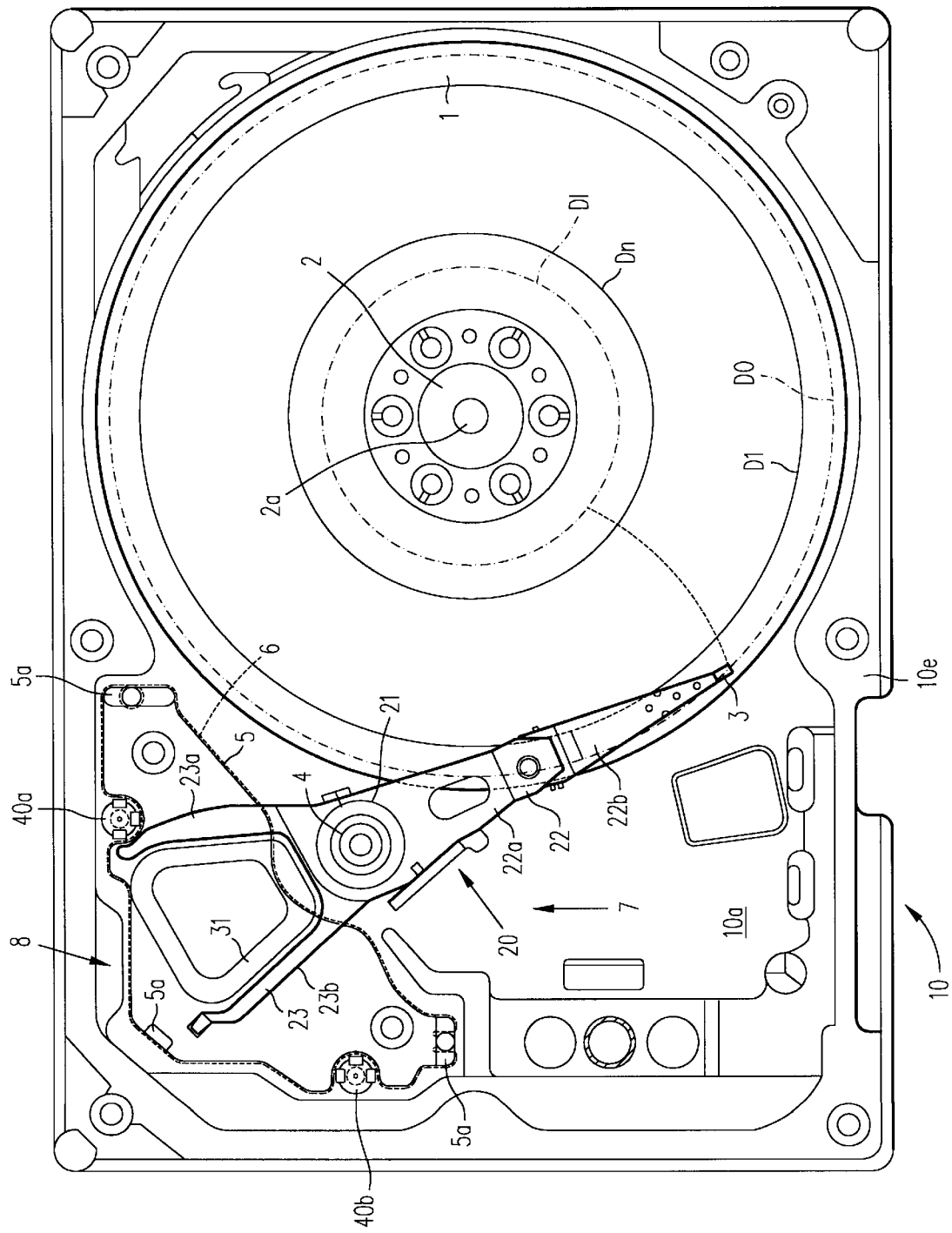
FIG. 1 is a top plan view showing a magnetic-disk drive according to the present invention.

FIG. 1 is a top plan view showing the rough constitution of a magnetic-disk drive according to an embodiment of the present invention, the upper lid of the enclosure having been removed. Also, an upper yoke is indicated by a dotted line 6 so that the lower portion can be viewed. The magnetic-disk drive shown in FIG. 1 houses in enclosure 10 a magnetic disk 1 which is a data storage medium, a spindle motor 2 for driving the magnetic disk 1 to rotate, an actuator 7 for moving a magnetic head 3 to a desired access position on the magnetic disk 1, a rotational shaft 4 which becomes the center of rotation of the actuator 7, lower and upper yokes 5 and 6 where the voice coil motor (VCM) 8 of the actuator 7 is disposed in the space therebetween, and outer and inner crash stops 40a and 40b for regulating the range of rotation of the actuator 7. In the enclosure 10, the side portion 10b is formed integrally in frame form on the peripheral portion of the bottom portion (referred to as a base) 10a.

A plurality of magnetic disks 1 are mounted and these magnetic disks 1 are fastened to the rotor of the spindle motor 2 by means of screws. The magnetic disks 1 are driven to rotate on a spindle 2a by the spindle motor 2. The magnetic head 3 is one which records data from a control section (not shown) on the magnetic disk 1 and which reads out this recorded data from the magnetic disk 1 and sends the data to the control section. The magnetic head 3 is equipped with a magnetoresistive (MR) sensor for reading out data and a thin-film head for recording data. The aforementioned control section is provided on the exterior surface of the base 10a (on the opposite side of the surface where the magnetic disk 1 and other components are disposed). Although not shown, the magnetic head 3 is connected to the control section by head wires and a flexible printed circuit (FPC). The rotational shaft 4 is fastened to the base 10a.

Figure 2A:
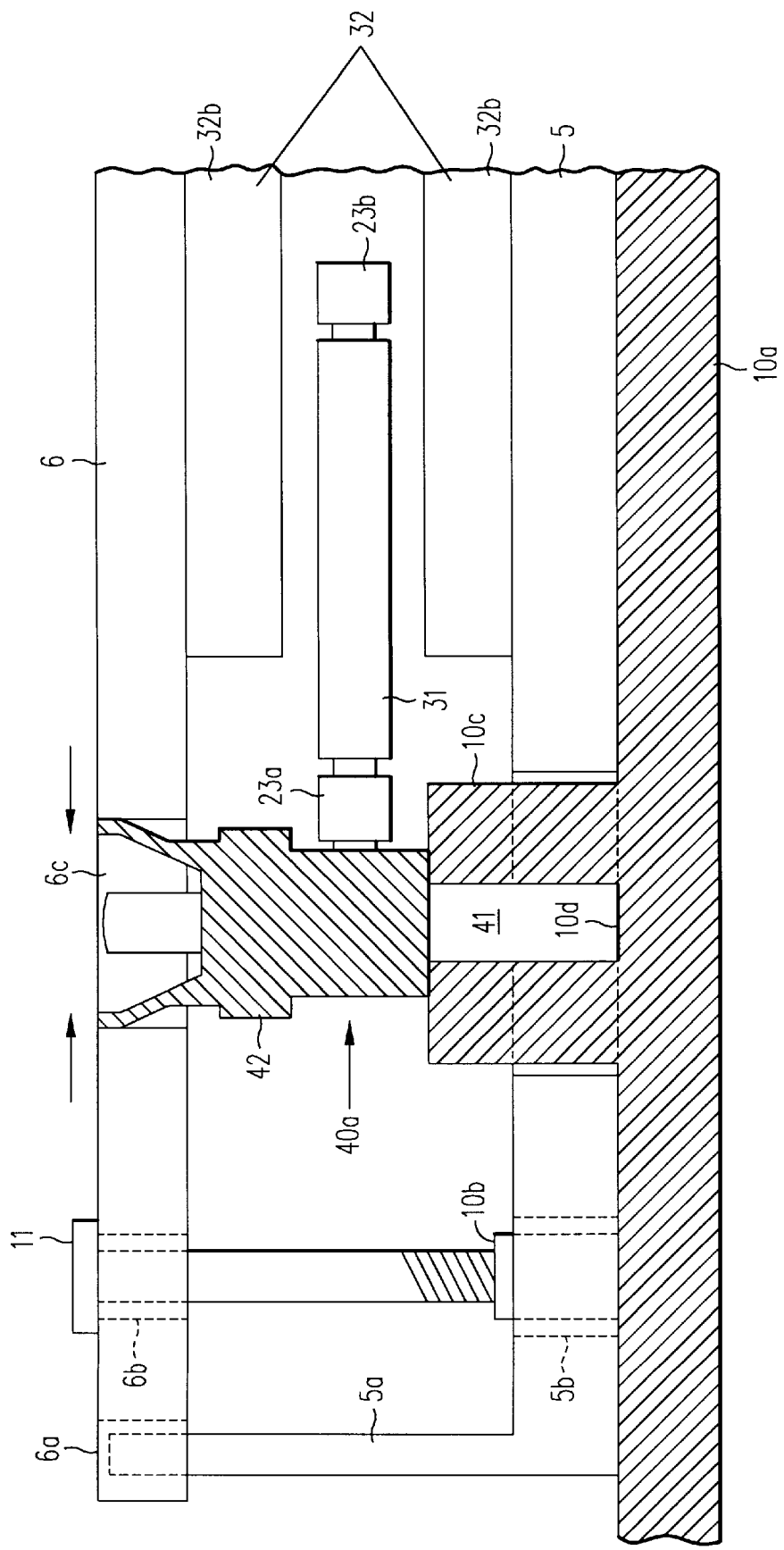
FIGS. 2(a) and 2(b) are sectional views showing the structure of the outer crash stop of the present invention.
Figure 2B:
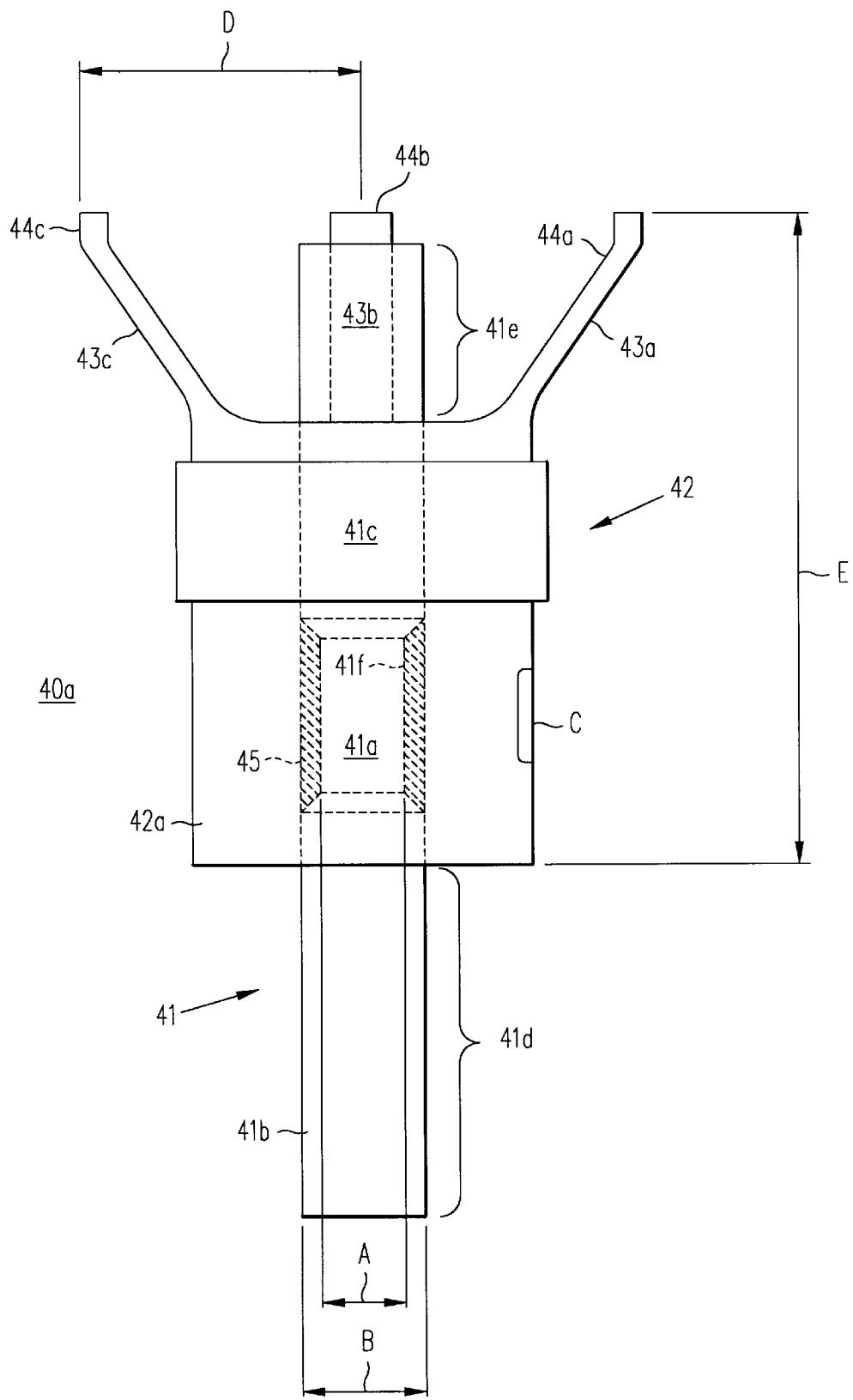

FIGS. 2(a) and 2(b) are sectional views showing the structures of the outer crash stop and the periphery in the magnetic disk drive of FIG. 1. Note that the peripheral structure of the inner crash stop 40b is the same as that shown in FIG. 2(a). In FIGS. 1 and 2 the actuator 7 has a carriage 20 fitted on the rotational shaft 4 as to be free to rotate and a VCM 8 for driving the carriage 20 to rotate. The VCM 8 has a voice coil 31 and a magnetic circuit 32.

The carriage 20 has a bearing portion 21 for being fitted onto the rotational shaft 4, a head arm 22, and a stopper arm 23 extending in the form of V from the bearing portion 21. The head arm 22 comprises a carriage arm 22a and a spring arm 22b hung on the front end of the carriage arm 22a. On the front end of the spring arm 22b the magnetic head 3 is mounted. The stopper arm 23 consists of an outer arm 23a which abuts the outer crash stop 40a when moved toward the outer crash stop 40a (as shown in FIG. 2(a)) and an inner arm 23b which abuts the inner crash stop 40b when moved toward the inner crash stop 40b. On the interior surface of the stopper arm 23 the voice coil 31 is mounted. The bearing portion 21, the carriage arm 22a, and the stopper arm 23 are formed integrally with one another. The head arm 22 and the stopper arm 23 are disposed so that they are located on opposite sides across the bearing portion 21.

Note that although only a single carriage arm 22a is shown, a plurality of carriage arms 22a may be disposed in the form of a comb. When the carriage arms 22a are moved over magnetic disks 1, the magnetic disk 1 and the carriage arm 22a are alternately positioned. Also, the uppermost and lowermost carriage arms 22a each have a single spring arm 22b hung on one surface of the front end of each arm, and the intervening carriage arms 22a each have two spring arms 22b hung on both surfaces of the front end of each arm. Furthermore, the magnetic head 3 mounted on the uppermost or lowermost spring arm 22b is used for the upper surface of the magnetic disk 1, and the magnetic heads 3 mounted on the intervening spring arm 22b are used for the upper and lower surfaces of the magnetic disk 1.

The VCM 8, as described above, has both the voice coil 31 mounted on the interior surface of the stopper arm 23 and the magnetic circuit 32. The magnetic circuit 32 is formed by the lower and upper yokes 5 and 6, a lower permanent magnet 32a seated on the upper surface of thee lower yoke 5, and an upper permanent magnet 32b seated on the lower surface of the upper yoke 6.

The lower yoke 5 is seated on the base 10a of the enclosure 10. On the end of this lower yoke 5, three support shafts 5a are provided for supporting the upper yoke 6. Also, the lower yoke 5 is formed with an opening 5b into which a screw stopping portion 10b provided on the base 10a is inserted.

The upper yoke 6 is disposed by the three support shafts 5a and a screw 11 so that it covers the upper space of a crash stop support hole 10d provided in the crash stop support portion 10c of the base 10a and also covers the upper space of the lower yoke 5. The upper yoke 6 is formed with a screw hole 6b for the screw 11 and crash stop inserting holes 6c. The upper yoke 6 is placed on the upper surface of the support shaft 5a and is fastened by inserting the screw 11 into the screw hole 6b and then tightening the screw 11 into the screw stopping portion 10b. The crash stop inserting hole 6c in this embodiment is a cutout that has a semicircular front end portion formed in the end portion of the upper yoke 6. The crash stop support hole 10d and the crash stop inserting holes 6c are provided at the positions at which the two crash stops 40a and 40b are attached, respectively.

The voice coil 31 is mounted and the stopper arm 23 supported by the carriage 20 is disposed in the space between the lower yoke 5 provided with the permanent magnet 32a and the upper yoke 6 provided with the permanent magnet 32b. This stopper arm 23 is rotated between the crash stops 40a and 40b by the VCM 8. This rotation causes the magnetic head 3 mounted on the head arm 22 to move along the surface of the magnetic disk 1.

On the surface of the magnetic disk 1 there are data tracks on which the magnetic head 3 records data and servo tracks on which servo data is prerecorded. The control section (not shown) reads out servo data from the servo track by the magnetic head 3, and based on this servo data, current flows through the voice coil. As a result, the VCM 8 is driven, thereby moving the magnetic head 3 over a desired data track.

Figure 3:
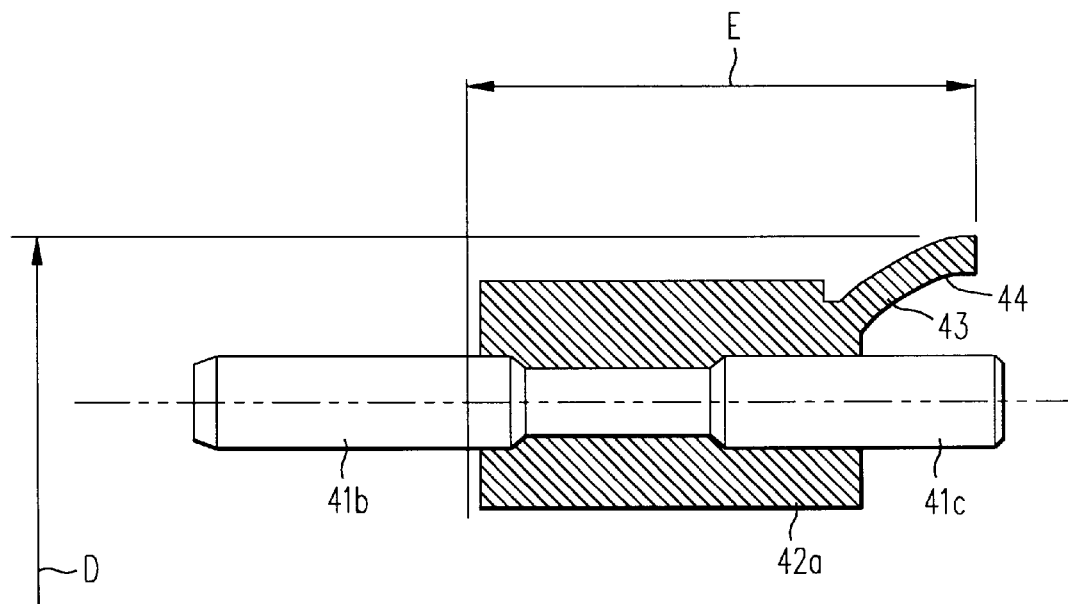
FIG. 3 is a partial cutaway plan view of the elastic body of the outer crash stop of the present invention.
Figure 4:
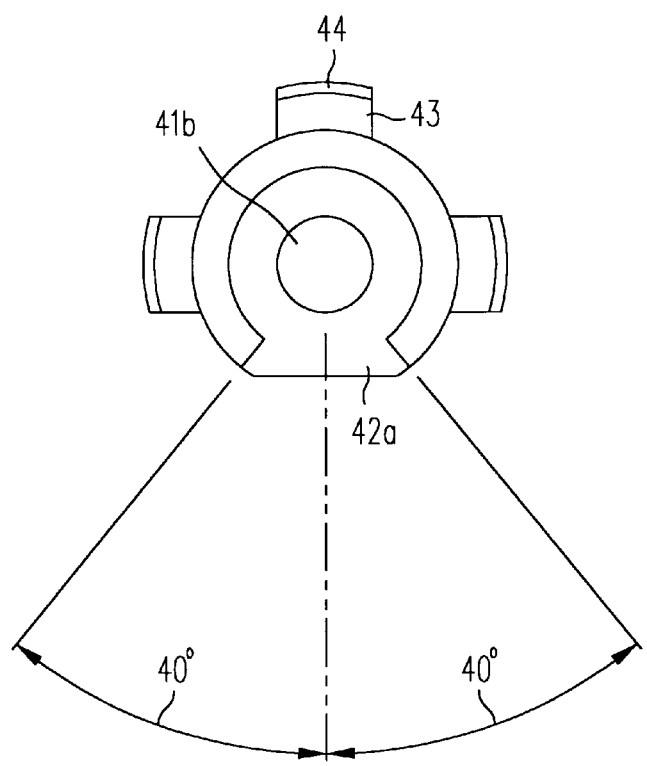
FIG. 4 is a left side view of FIG. 3.
Figure 5:
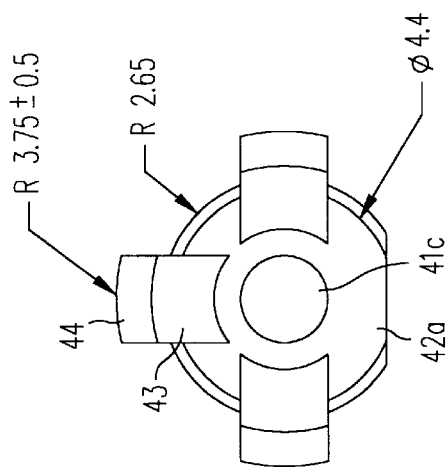
FIG. 5 is a right side view of FIG. 3.
Figure 6:
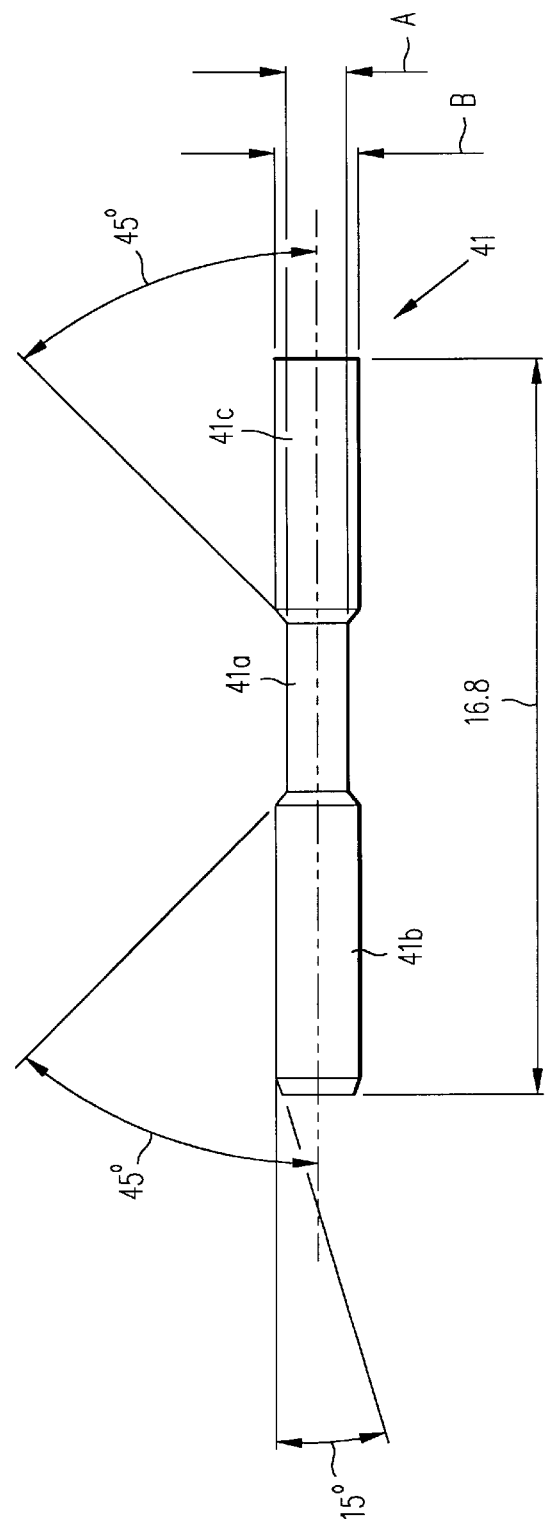
FIG. 6 is a plan view of the metal pin of the crash stop according to the present invention.

FIGS. 3 through 6 are detail diagrams showing a design dimension example of the crash stop 40. FIG. 3 is a partial cutaway plan view of an elastic body 42, FIG. 4 a left side view of FIG. 3, FIG. 5 a right side view of FIG. 3, and FIG. 6 a plan view of a metal pin 41. In FIGS. 2 through 6, the outer crash stop 40a and the inner crash stop 40b regulate the range of rotation of the actuator 7 and also position the magnetic head 3 at the initial position or the evacuating position when the magnetic-disk drive is operated or stopped. The outer crash stop 40a and the inner crash stop 40b each consist of a metal pin 41 and an elastic body 42 which covers a portion of this metal pin 41.

In the metal pin 41, an annular recess 41f is provided in the intermediate portion 41a of the shaft-shaped stainless steel member by making the intermediate portion 41a into a small diameter portion and the lower portion 41b and the upper portion 41c into large diameter portions. The outer diameter dimension of the intermediate portion 41a is taken to be A and the outer diameter dimension of the lower and upper portions 41b and 41c is taken to be B. The recess 41f of the metal pin 41 is formed, for example, by cutting the intermediate portion of a shaft-shaped stainless steel member with an outer diameter dimension of A into the outer diameter dimension B. Also, part of the lower portion 41b on the end side is used as a support portion 41d, and part of the upper portion 41c on the end side is used as a knob portion 41e.

The elastic body 42 comprises a cylindrical portion 42a and three blade portions 43a, 43b, and 43c. The hollow portion of the cylindrical portion 42a is used as a pin inserting hole. The elastic body 42 is formed, for example, from polyurethane rubber. The metal pin 41 is press fitted into the pin inserting hole of the elastic body 42 so that the portion between the support portion 41d and the knob portion 41e of the metal pin 41 is covered with the elastic body 42. In the boundary between the intermediate portion 41a of the metal pin 41 and the elastic body 42, an annular cavity 45 is formed. The support portion 41d not covered with the elastic body 42 is a portion which is freely detachably inserted into the crash stop support hole 10d provided in the base 10a. The knob portion 41e not covered with the elastic body 42 is a portion which is picked up by pickup means such as a pincette in a mounting operation in which the crash stop 40 is inserted through the crash stop inserting hole 6c formed in the upper yoke 6 and then the support portion 41d is fitted into the crash stop support hole 10d or in a pulling-out operation in which the support portion 41d is pulled out of the crash stop support hole 10d and then the crash stop 40 is pulled out from the crash stop inserting hole 6c.

The blade portions 43a, 43b, and 43c protrude from the circumferential edge on the side of the knob portion 41e in a direction forming an acute angle with the knob portion 41e. The protruded positions of the blade portions 43a and 43b and the protruded positions of the blade portions 43b and 43c on the circumferential edge on the side of the knob portion 41e differ by 90°, respectively. When the crash stop 40 is incorporated into the magnetic-disk drive shown in FIG. 1, the upper ends 44a, 44b, and 44c of the blade portions 43a, 43b, and 43c contact the inner wall of the crash stop inserting hole 6c of the upper yoke 6, and the blade portions 43a, 43b, and 43c are elastically contracted. As a consequence, frictional force is generated between the blade portions 43a, 43b, and 43c and the side surface of the crash stop inserting hole 6c. This frictional force prevents upward displacement of the crash stop 40. Furthermore, the upper ends 44a, 44b, and 44c each have a smooth curve which becomes a natural convex state toward the outside so that the upper ends can surface-contact the side surface of the crash stop inserting hole 6c.

Reference character C shown in FIG. 2(b) represents a surface region of the elastic body 42 which the stop arm 23 abuts when the crash stop 40 is incorporated into the magnetic-disk drive shown in FIG. 1. The cavity 45 formed between the metal pin 41 and the elastic body 42 is provided so as to include a boundary region corresponding to the abutting surface region C, and in cooperation with the elastic body 42, the cavity 45 absorbs the abutting shock of the stopper arm 23. In other words, the cavity 45 is provided partially in the boundary region between the metal pin 41 and the elastic body 42 so that the abutting shock of the stopper arm 23 can be absorbed in cooperation with the elastic body 42. The cavity 45 is provided in the form of a ring so as to include a boundary region which is cut out to form the height region of the abutting surface region C. The height region of the abutting surface region C means a horizontal space region surrounded between a lower horizontal plane whose height is equal to the lower end of the abutting surface region C and an upper horizontal plane whose height is equal to the upper end.

It is preferable that the inner diameter of the crash stop support hole 10d, the outer diameter dimension B of the support portion 41d, and a tolerance between them be determined so that the support portion 41d of the metal pin 41 has no play in it and so that the engagement and disengagement of the support portion 41b with the crash stop support hole 10d can be smoothly performed, when the crash stop 40 is incorporated into the magnetic-disk drive. In addition, there is a need to design the height dimension of the crash stop support portion 10c, the positional relationship between the elastic body 42 and the cavity 45, and the length dimension of the intermediate portion 41a so that a region corresponding the height region of the abutting region C is positioned within the intermediate portion 41a. Furthermore, it is necessary that the radial dimension D from the axis center of the metal pin 41 to the outer end of the blade portion 44, the height dimension of the crash stop support portion 10c, the height dimension E from the lower end of the elastic body 42 to the upper end of the blade portion 44, and the height dimension of the support shaft 5a of the lower yoke 5 have been designed so that the upper end of the blade portion 44 is positioned within the height region of the upper yoke 6 and also elastically contracted and contacts the inner wall of the crash stop inserting hole 6c.

In FIGS. 3 through 6 the outer diameter dimension A of the intermediate portion 41a of the metal pin 41 is 1.5 mm and the outer diameter dimension B of the lower and upper portions 41b and 41c is 2 mm. Therefore, the thickness of the cavity 45 is 0.25 mm. The outer radius dimension of the elastic body 42 is 2.65 mm, so the thickness of the elastic body 42 is 0.65 mm. Furthermore, the radial dimension D from the axis center of the metal pin 41 to the upper end of the blade portion 44 is 3.5 mm and the height dimension E from the lower end of the crash stop support portion 10c to the upper end of the blade portion 44 is 10.8 mm.

Figure 7:
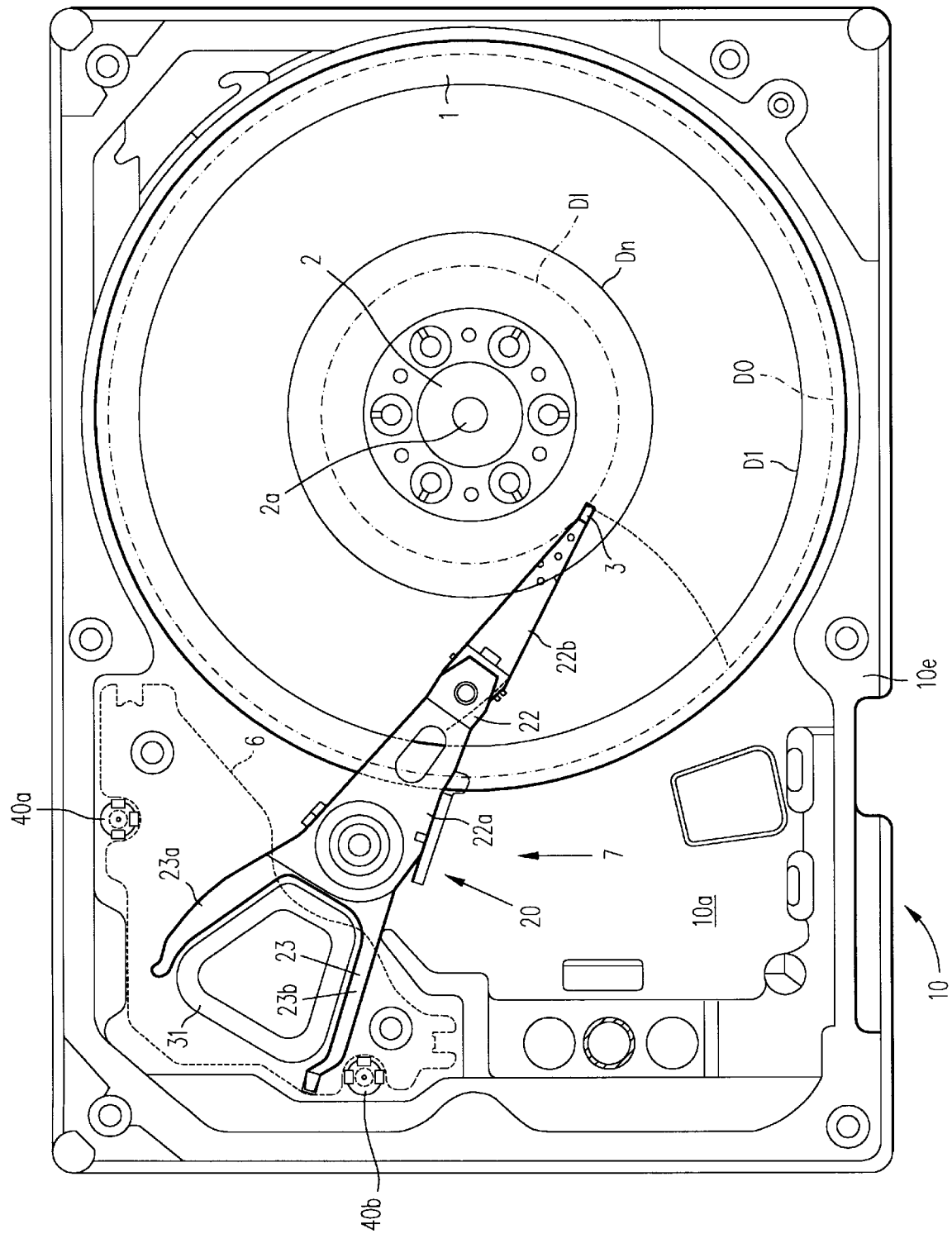
FIG. 7 is a top plan view showing the same magnetic-disk drive as that of FIG. 1, the magnetic head having been evacuated to its evacuation position.

FIG. 7 is a top plan view showing the same magnetic-disk drive as that of FIG. 1, the magnetic head 3 having been evacuated to its evacuating position (also referred to as the inner diameter or ID of the disk). Note that FIG. 1 illustrates the magnetic head 3 held in its initial position (often referred to as the outer diameter or OD of the disk). As shown in FIG. 7, the inner arm 23b of the stopper arm 23 is brought into contact with the inner crash stop 40b, thereby evacuating the magnetic head 3 over the circumferential evacuating position of the magnetic disk 1. At this time, a magnet is provided near the inner crash stop 40b for attracting the inner arm 23b by suction, or the metal pin 41 of the inner crash stop 40b is made into a magnet to perform the aforementioned attracting-locking operation, and the inner arm 23b is locked.

A description will now be made in brief for the manufacturing procedure of the magnetic-disk drive shown in FIGS. 1 and 7. First, the assembling procedure will be described. The spindle motor 2 is incorporated into the interior of the enclosure 10 formed integrally with the rotational shaft 4, the two crash stop support portion 10c, and so on, attached to the base 10a. Then, a plurality of magnetic disks 1 having no servo data are fastened to the rotor of the spindle motor 2 by means of screws. Also, the lower yoke 5 with the permanent magnet 32a attached thereto is seated on the base 10a of the enclosure 10.

Next, the voice coil 31 is attached to the stopper arm 23, and the bearing portion 21 of the carriage 20 with the magnetic heads 3 mounted on the front ends of the head arms 22 provided in the form of a comb is fitted on the rotational shaft 4. The carriage 20 is rotated on the rotational shaft 4 and thereby the magnetic heads 3 are moved between the magnetic disks 1, respectively. The end portion of a FPC cable (not shown) on the side of the magnetic head has been attached to the side surface of the carriage 20, and the head wires from the magnetic heads 3 and the coil wires from the voice coil 31 have been connected to the end portion of the FPC. The opposite end of the FPC cable is connected through a connector to the control section (not shown).

The upper yoke 6 with both the permanent magnet 32b attached thereto and two crash stop inserting holes 6c formed therein is placed on the support shaft 5a of the lower yoke 5 and is fixed at the upper space of the lower yoke 5 by the screw 11.

Next, the outer and inner crash stops 40a and 40b are incorporated into the magnetic-disk drive. More specifically, the knob portion 41e of the crash stop 40 is picked up by pickup means such as a pincette, then inserted into the crash stop inserting hole 6c from the side of the support portion 41d, and the support portion 41d is fitted into the crash stop support hole 10d so that it can be freely pulled out. At this time, the outer surface of the upper end of the blade portion 44 contacts the inner side surface of the crash stop inserting hole 6c and is contracted, and by the frictional force generated between the crash stop inserting hole 6c and the upper end of the blade portion 44, the crash stop 40a is locked. Thereafter, the upper cap is mounted on the enclosure 10, thereby completing the assembly of the magnetic-disk drive. Because of the incorporation of crash stop 40, the magnetic heads 3 cannot be pulled from between the magnetic disks 1, but in the case where the crash stop 40 needs to be demounted, for example, due to the repairing operation of the magnetic disk 3, it can be easily demounted, if the knob portion 41e is picked up and pulled out by pickup means such as a pincette.

A procedure of recording servo data on the magnetic disk 1 will now be described. First the magnetic disk 1 is rotated to float the magnetic head 3 from the surface of the magnetic disk 1 and then the VCM 8 is driven to bring the outer arm 23a of the coil arm 23 into contact with the outer crash stop 40a. The circumference D0 corresponding to the position of the magnetic head 3 at this time becomes the outermost servo track and also becomes a circumferential initial position. Servo data is recorded in sequence at predetermined intervals from the circumference D0 toward the inner side of the magnetic disk 1, that is, the center. The innermost servo track Dn is outside the circumferential evacuating position at the disk ID. By reading out with the magnetic head 3 the servo data recorded on the servo tracks from the outermost servo track D0 to the innermost servo track Dn, the aforementioned control section will be able to recognize a position on the surface of the magnetic disk 1. Also, a data track on which data is recorded is disposed between servo tracks.

Next, on a predetermined data track on the region from the outermost servo track D0 to the servo track D1, the microcode is recorded which represents a reset operation that is performed when the magnetic-disk drive is started. From the foregoing, the region from servo track D0 to servo track D1 becomes a microcode recording region, the region from servo track D1 to servo track Dn becomes a user data storage region, and the region from servo track Dn to the circumferential evacuating position becomes a magnetic-head evacuating position.

The operation of the magnetic-disk drive shown in FIGS. 1 and 7 will now be described. In the stopped state of operation of the magnetic-disk drive, the magnetic head 3 has touched the circumferential evacuating position on the surface of the magnetic disk 1, and the inner arm 23b of the stopper arm 23 has abutted the inner crash stop 40b. Now, if the magnetic-disk drive is started, the spindle motor 2 will be driven to rotate the magnetic disk 1, thereby floating the magnetic head 3 from the surface of the magnetic disk 1. Then, the VCM 8 is driven and the outer arm 23a of the stopper arm 23 abuts the outer crash stop 40a, thereby moving the magnetic head 3 from the evacuating position to the circumferential initial position D0. The magnetic head 3 is further moved over the data track on which microcode is recorded, and microcode is read out. According to the microcode read out, various reset operations are performed. After these reset operations have been completed, write and read operations by the magnetic head 3 in the user data storage region will be performed.

When the operation of the magnetic-disk drive is stopped, the VCM 8 is driven and the stopper arm 23 abuts the inner crash stop 40a, thereby evacuating the magnetic head 3 over the circumferential evacuating position. Then, rotation of the magnetic disk 1 is stopped and the magnetic head 3 touches the surface of the magnetic disk 1. While the evacuating region has been disposed inside the user data storage region and the microcode region has been disposed outside the user data storage region, the evacuating region may also be disposed outside the user data storage region and the microcode region may also be disposed inside the user data storage region. In this case, when the magnetic-disk drive is in the stopped state of operation, the outer arm 23a of the stopper arm 23 will abut the outer crash stop 40a.

When the VCM 8 has run recklessly during operation of the magnetic-disk drive, the stopper arm 23 crashes on the crash stop 40a or 40b and stops, thereby preventing the magnetic head 3 from moving inside the circumferential evacuating position or outside the outermost servo track and from crashing on the spindle motor 2 or other mechanisms of the magnetic-disk drive.

A description will now be made of the crash test for comparing the performance of the crash stop 40 of the present invention provided with the cavity 45 in the boundary between the metal pin 41 and the elastic body 42 and the performance of a conventional crash stop having no cavity in the boundary between the metal pin and the elastic body. First, three samples $S_i$ and three samples $S_n$ were prepared. The sample $S_i$ is the crash stop 40 of the present invention, and in the sample $S_n$, the outer diameter dimension of the intermediate portion 41 was made equal to the upper portion 41c and the lower portion 41b. That is, the sample $S_n$ is the conventional crash stop where a metal pin without the reduced intermediate portion 41 is covered with the elastic body 42 in the same way as the sample $S_i$. The aforementioned samples $S_i$ and $S_n$ were incorporated as outer crash stops in the magnetic-disk drive shown in FIG. 1. The VCM 8 was driven and the outer arm 23a of the stopper arm 23 crashed on the sample $S_i$ or $S_n$ at a crashing velocity of $V_c$ m/s. At this time, the maximum deflection quantity $S_{way}$ (mm) of the magnetic head 3 and the maximum stopping acceleration G (m/s$^2$) of the magnetic head 3 were measured.

The maximum deflection quantity $S_{way}$ is the maximum instantaneous displacement from a steady position at the time of crash of the magnetic head 3. The steady position is the position of the magnetic head 3 when the outer arm 23a abuts the outer crash stop and is stopped, that is, the position on the circumference D0. When the stopper arm crashes, the magnetic head 3 is instantaneously displaced outside the circumference D0 due mainly to deformation of the crash stop. The maximum stopping acceleration G is the maximum instantaneous stopping acceleration of the magnetic head 3 at the time of crash and is used as a standard for the shock absorptivity of the crash stop.

In the setting of the crashing velocity $V_c$ and the measurements of the maximum deflection quantity $S_{way}$ and maximum stopping acceleration G, an optical fiber sensor was employed. With the crashing velocity $V_c$ set to two ways, 2.74 m/s and 3.52 m/s and the surrounding temperature set to three ways, room temperature (20°), low temperature (3° C.), and high temperature (60°), respective crash experiments were performed.

TABLE 1

| | | Surrounding Temp. | | | | |
|---|---|---|---|---|---|---|
| | | Low Temp. 3° C. | | Room Temp. 20° C. | | High Temp. 60° C. |
| $V_c$ | | $S_{way}$ | G | $S_{way}$ | G | $S_{way}$ | G |
| 2.74 (m/s) | $S_n$ | 0.721 | 0.873 | 1.000 | 1.000 | 1.135 | 0.671 |
| | $S_i$ | 1.072 | 0.668 | 1.381 | 0.663 | 1.584 | 0.559 |
| 3.52 (m/s) | $S_n$ | 0.953 | 1.115 | 1.227 | 1.213 | 1.370 | 0.840 |
| | $S_i$ | 1.286 | 0.825 | 1.679 | 0.821 | 1.838 | 0.704 |

The result of the aforementioned crash experiments is shown in Table 1. The value of the maximum deflection quantity $S_{way}$ and the value of the maximum stopping acceleration G shown in Table 1 is an average value of the three samples and furthermore is normalized with the value of the sample $S_n$ at a velocity of $V_c$=2.74 m/s and a surrounding temperature of 20° C. as "1."

From Table 1 it is found that the maximum stopping acceleration G of the sample $S_i$ which is the crash stop of the present invention has become smaller than that of the sample $S_n$ which is the conventional crash stop. A small maximum stopping acceleration G means that an operation of temporally dispersing shock force is high, that is, shock absorptivity is high. Therefore, it can be said that the sample $S_i$ is superior in shock absorptivity to the sample $S_n$.

Furthermore, temperature cycle and shock experiments were done for investigating the positioning stability of the crash stop 40 of the present invention. Although the detailed description of the experiments is omitted, the temperature cycle experiment is one where an operation of alternately letting the magnetic-disk drive having the crash stop 40 incorporated therein alone into a low-temperature atmosphere and a high-temperature atmosphere is repeated predetermined cycles, then the magnetic-disk drive is started, and it is investigated whether or not the magnetic head 3 is capable of normally reading out the servo data on the circumferential initial position, that is, on the outermost servo track D0. In the case where the elastic body 42, for example, has been deformed and therefore the position at which the outer arm 23a of the head arm 23 abuts the outer crash stop 40a has slipped out of place, the magnetic head 3 will not be correctly positioned over the circumferential initial position D0 and will not be able to read out the servo data on the outermost servo track D0. The shock experiment is one where the crash stop 40 is given a predetermined shock force with a shock tester, then the magnetic-disk drive is started, and it is investigated whether or not the magnetic head 3 is capable of normally reading out the servo data on the outermost servo track D0. In either case the servo data on the outermost servo track D0 could be read out normally.

Thus, in the preferred embodiment, by providing the cavity 45 in the boundary between the metal pin 41 and the elastic body 42, the shock absorptivity of the crash stop 40 can be enhanced without changes in outside dimensions and elastic material, whereby the protection performance of the actuator can be enhanced. Also, by varying the outer diameter dimension A of the intermediate portion 41a of the metal pin 41 to vary the thickness of the cavity 45, the shock absorptivity of the crash stop 40 can be finely adjusted.

In addition, the elastic body 42 has been provided with the blade portions 43, the support portion 41d of the metal pin 41 has been fitted into the crash stop support hole 10d so that it can be freely pulled out and inserted, and the upper ends of the blade portions 44 have contacted with the inner side surface of the crash stop inserting hole 6c, while being contracted. As a consequence, there is no need to connect the crash stop 40 through screw connection and the mounting and demounting of the crash stop 40 to the magnetic-disk drive can easily be performed, whereby the assembling and maintenance operations of the magnetic-disk drive can be simplified.

Figure 8:
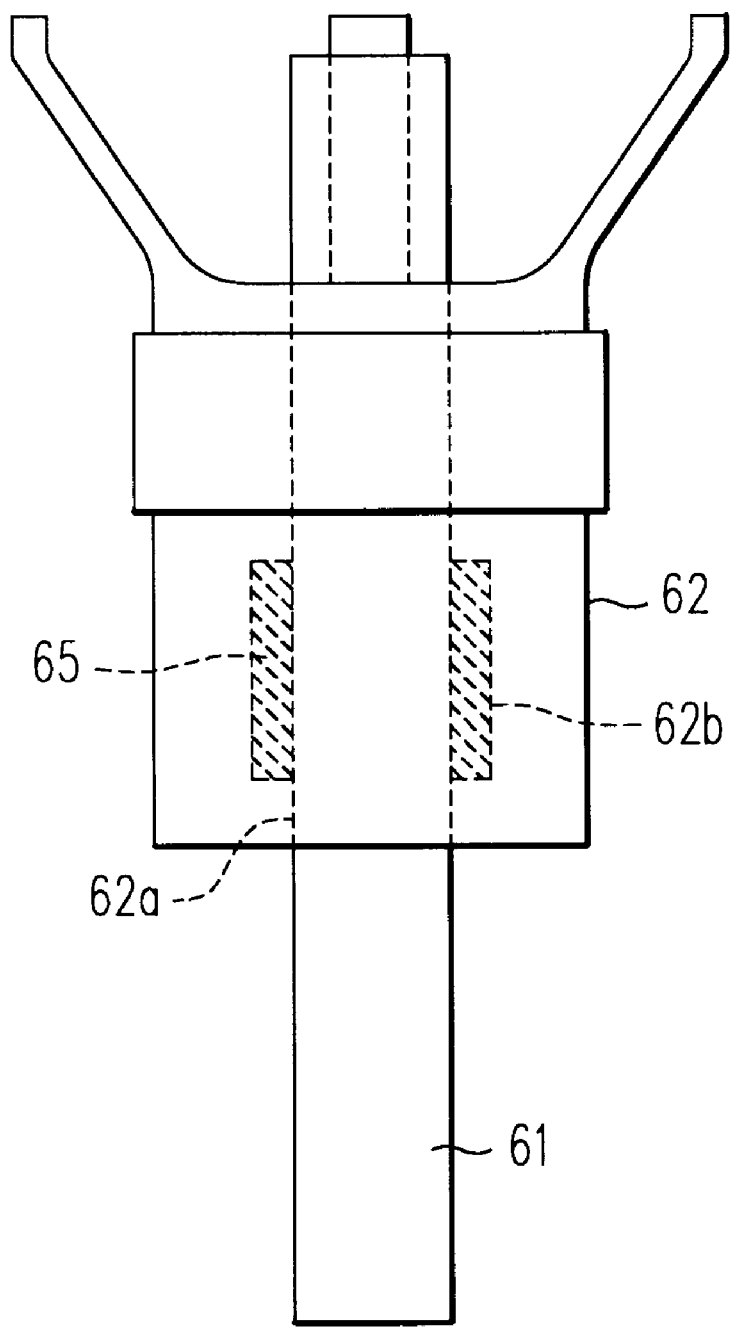
FIG. 8 is a sectional view showing an alternative embodiment of the crash stop of the present invention.

In the preferred embodiment, while the recess for forming the cavity 45 has been provided in the metal pin 41, this recess may also be provided in the elastic body 42. FIG. 8 is a sectional view showing the structure of a crash stop having a recess provided in an elastic body for forming a cavity. In the crash stop shown in FIG. 8, a shaft-shaped metal pin 61 is press fitted into the pin inserting hole 62a of an elastic body 62. A ring-shaped recess 62b is provided in the inner surface of the pin inserting hole 62a. The recess 62b and the metal pin 61 form a cavity 65.

The metal pin 41 shown in FIG. 2 may also be combined with the elastic body 62 shown in FIG. 8 to constitute a crash stop. In this case the variable range of the cavity thickness can be widened, so a width of adjustment in shock absorptivity can be further widened.

In addition, the configuration of the metal pin 41 is not limited to a shaft shape, and the configuration of the elastic body 42 is not limited to a cylindrical shape. Furthermore, the cavity 45 will be sufficient if it is partially formed so that it includes a boundary region corresponding to the aforementioned abutting surface region C, that is, in a boundary region which can absorb the abutting shock of the stopper arm 23 in cooperation with the elastic body 42. The configuration of the cavity is not limited to a ring shape but it may also be a semicircular shape.

The number of blade portions 43 is not limited to three but it may also be two or more. Also, the protruded position of the blade portion 43 on the elastic body 42 is not limited to the position shown in FIG. 2.

Additionally, the material of the metal pin 41 is not limited to stainless steel, and the material of the elastic body 42 is not limited to polyurethane rubber.

As has been described above, in the crash stop of the present invention there is the advantage that the shock absorptivity can be enhanced without changes in outside dimensions and elastic material, by providing the cavity in the boundary between the metal pin and the elastic body. Also, by varying the thickness of the cavity, there is the advantage that the shock absorptivity can be finely adjusted.

The elastic body has been provided with the blade portions, the support portion of the metal pin has been fitted into the crash stop support hole so that it can be freely pulled out and inserted, and the upper ends of the blade portions have contacted with the inner side surface of the crash stop inserting hole, while being contracted. With this arrangement, the crash stop can be mounted without using screws and therefore there is the advantage that the mounting and demounting of the crash stop to the magnetic-disk drive can easily be performed.

Furthermore, in the disk drive of the present invention there is the advantage that the protection performance of the actuator can be enhanced, by employing the crash stop provided with the cavity in the boundary between the metal pin and the elastic body. Finally, by employing the crash stop which has the support portion and the blade portions, there is the advantage that the assembling and maintenance operations can be simplified.

We claim:

1. A crash stop for regulating a range of rotation of an actuator of a disk drive comprising:

a shaft shaped metal pin having an intermediate smaller diameter portion and a larger diameter upper and lower portion; and an elastic body having a pin inserting hole with an interior surface having a diameter equal to said larger diameter, said elastic body further comprising an outer surface region, wherein by press fitting said pin into said elastic body, a cavity is created therebetween in the intermediate region between the metal pin smaller diameter portion and the pin inserting hole interior surface such that said cavity corresponds to a position of said outer surface region against which said actuator abuts.

2. A crash stop for regulating a range of rotation of an actuator of a disk drive comprising:

a metal pin; and an elastic body having a pin inserting hole with an interior recess portion on an inner surface of said pin inserting hole, said elastic body further comprising an outer surface region, wherein by press fitting said pin into said elastic body, a cavity is created therebetween in the region between the metal pin and the recess in the pin inserting hole such that said cavity corresponds to a position of said outer surface region against which said actuator abuts.

3. The crash stop as set forth in claim 2, wherein said recess of said elastic body is formed by making a hollow portion of a cylindrical elastic member as a pin inserting hole and forming a recess in the form of a ring in an inner surface of said pin inserting hole.

4. The crash stop as set forth in claim 2 wherein by press-fitting a metal pin provided with a recess in its intermediate portion corresponding to the recess of said elastic body into said elastic body, said cavity is formed by the recess of said metal pin and the recess of said elastic body.

5. The crash stop as set forth in claim 4, wherein said recess of said metal pin is formed in ring form by making an intermediate portion of a shaft-shaped metal member into a small diameter portion and an upper portion and a lower portion into large diameter portions; and further wherein said recess of said elastic body is formed by making a hollow portion of a cylindrical elastic member into a pin inserting hole and forming a recess in the form of a ring in an inner surface of said pin inserting hole.

6. A crash stop for regulating a range of rotation of an actuator of a disk drive, comprising:

a metal pin; and an elastic body which covers said metal pin, wherein said metal pin has a first end portion and a second end portion, the first end portion being used as a support portion which is freely removably fitted into a crash stop support hole provided in a bottom portion of an enclosure of said disk drive, and the second end portion being used as a knob portion for allowing said support portion to be detachable with respect to said crash stop support hole; and further wherein said elastic body covers a portion of said metal pin between said support portion and said knob portion and also has two or more blade portions which protrude in a same general direction as the knob portion thereby forming an acute angle with said knob portion, wherein upper ends of said blade portions contact an inner side surface of a crash stop inserting hole formed in an upper yoke, when said support portion is fitted into said crash stop support hole, and said upper yoke is disposed in upper space of said crash stop support hole and said crash stop inserting hole is positioned just above said crash stop support hole.

7. The crash stop as set forth in claim 6, wherein said upper ends of said blade portions each have a smooth curve which becomes a natural convex state toward the outside so that the upper ends can surface-contact said crash stop inserting hole.

8. The crash stop as set forth in claim 6, wherein said blade portions of said elastic body protrude from a circumferential edge of a cylindrical elastic member on the side of said knob portion.

9. The crash stop as set forth in claim 6, further comprising a cavity provided in a boundary between said metal pin and said elastic body.

10. The crash stop as set forth in claim 6, wherein said metal pin comprises stainless steel and said elastic body comprises polyurethane.

11. In a disk drive equipped in the interior of an enclosure with:

a disk which is a data storage medium;

an actuator having a head arm and a stopper arm and rotatable on a rotational shaft so that a magnetic head mounted on a front end of said head arm is moved along a surface of said magnetic disk; and a crash stop which regulates a range of rotation of said actuator when said stopper arm abuts said crash stop;

the disk drive wherein said crash stop further comprises:
a shaft-shaped metal pin having an intermediate smaller diameter portion and a larger diameter upper and lower portion; and an elastic body having a pin inserting hole with an interior surface having a diameter equal to said larger diameter, said elastic body further comprising an outer surface region, wherein by press fitting said pin into said elastic body, a cavity is created therebetween in the intermediate region between the metal pin smaller diameter portion and the pin inserting hole interior surface such that said cavity corresponds to a position of said outer surface region against which said actuator abuts.

12. In a disk drive equipped interiorly of an enclosure with:

a disk which is a data storage medium;

an actuator having a head arm and a stopper arm and rotatable on a rotational shaft so that a magnetic head mounted on a front end of said head arm is moved along a surface of said magnetic disk; and a crash stop which regulates a range of rotation of said actuator when said stopper arm abuts said crash stop;

the disk drive wherein:

said enclosure is provided with a crash stop support hole at its bottom portion;

said crash stop comprises a metal pin and an elastic body covering said metal pin;

said metal pin has a first end portion and a second end portion, the first end portion being used as a support portion which is freely removably fitted into said crash stop support hole, and the second end portion being used as a knob portion for allowing said support portion to be detachable with respect to said crash stop support hole; and said elastic body covers a portion of said metal pin between said support portion and said knob portion and also has more than one blade portion which protrudes in a same general direction as the knob portion thereby forming an acute angle with said knob portion, and further wherein said elastic body covers a portion of said metal pin between said support portion and said knob portion and also has two or more blade portions which protrude in a same general direction as the knob portion thereby forming an acute angle with said knob portion, and wherein upper ends of said blade portions contact an inner side surface of a crash stop inserting hole formed in an upper yoke, when said support portion is fitted into said crash stop support hole, and said upper yoke is disposed in upper space of said crash stop support hole and said crash stop inserting hole is positioned just above said crash stop support hole.

* * * * *